US012542161B1

(12) United States Patent
Najafi

(10) Patent No.: US 12,542,161 B1
(45) Date of Patent: Feb. 3, 2026

(54) PERFORMANCE RECORDING DATA BASED ON TEMPORAL ANALYSIS

(71) Applicant: Hamid Najafi, San Francisco, CA (US)

(72) Inventor: Hamid Najafi, San Francisco, CA (US)

( * ) Notice: Subject to any disclaimer, the term of this patent is extended or adjusted under 35 U.S.C. 154(b) by 0 days.

(21) Appl. No.: 19/283,984

(22) Filed: Jul. 29, 2025

(51) Int. Cl.
*G11B 27/10* (2006.01)
*G06V 10/70* (2022.01)
*G06V 10/764* (2022.01)
*G06V 20/40* (2022.01)
*G06V 20/50* (2022.01)
*G06V 40/10* (2022.01)
*G06V 40/20* (2022.01)

(52) U.S. Cl.
CPC ............ *G11B 27/10* (2013.01); *G06V 10/764* (2022.01); *G06V 10/768* (2022.01); *G06V 20/41* (2022.01); *G06V 20/50* (2022.01); *G06V 40/10* (2022.01); *G06V 40/20* (2022.01)

(58) Field of Classification Search
CPC .... G11B 27/10; G06V 10/764; G06V 10/768; G06V 20/41; G06V 20/50; G06V 40/10; G06V 40/20
USPC .......................................................... 386/278
See application file for complete search history.

(56) References Cited

U.S. PATENT DOCUMENTS

| | | | | |
|---|---|---|---|---|
| 5,477,332 A | * | 12/1995 | Stone ..................... | G01N 21/55 356/613 |
| 11,720,949 B2 | * | 8/2023 | Wang .................... | H04L 65/611 705/26.7 |
| 2009/0144157 A1 | * | 6/2009 | Saracino ................ | G06Q 30/02 726/4 |
| 2025/0063156 A1 | * | 2/2025 | Xu ........................ | H04N 19/593 |
| 2025/0069395 A1 | * | 2/2025 | Shin ....................... | G06V 20/46 |

FOREIGN PATENT DOCUMENTS

WO    WO-2019079906 A1 *  5/2019   ........... G06K 9/6271

OTHER PUBLICATIONS

Brown, "Everything You Need to Know About Motion Tracking Webcam," Obsbot, https://www.obsbot.com/blog/webcam/motion-tracking-webcam ?srsitid=AfmBOogeKdJ10XIPLzFLGs9ovFzu08AfGeTAvcbDKtMZyoyileugeoA published Jul. 28, 2025, accessed on Oct. 23, 2025, 8 pages.

(Continued)

Primary Examiner — Helen Shibru
(74) Attorney, Agent, or Firm — Knobbe Martens Olson & Bear LLP

(57) ABSTRACT

Systems and methods are described for creating dynamic displays of live events in real-time. A real-time display of a live performance will typically have a static presentation because there is no time for video editing to take place before the event is displayed to an end user. This static display may be considered less entertaining to viewers and cause them to view an event as uninteresting. The present disclosure enables a system to analyze the live event in real-time detect objects and people within the frame, associate sounds from the recording with the detected people and objects and generate video commands on the fly to implement on the video as it is displayed to an end user. This will enhance the presentation and make it more dynamic. There is a manual override for the generated commands if a user prefers to watch the more static display.

20 Claims, 9 Drawing Sheets

(56) References Cited

OTHER PUBLICATIONS

"How Does Pivo Work? A Guide to Our AI-Powered Tripod Mount," Pivo Blog, https://blogpivo.wordpress.com/2023/11/06/how-does-pivo-work-a-quide-to-our-ai-powered-tripod-mount/, published Nov. 6, 2023, accessed on Oct. 23, 2025, 3 pages.

Obsbot.com, OBSBOT Tail 2—AI-Powered PTZR 4K Live Production Camera, retrieved from URL: https://www.obsbot.com/obsbot-tail-2-ptzr-4k-live-production-camera, published on or before Mar. 20, 2025 according to archive.org, accessed on Oct. 23, 2025, 25 pages.

Obsbot.com, OBSBOT Tail Air: AI-Powered 4K PTZ Streaming Camera, retrieved from URL: https://www.obsbot.com/obsbot-tail-air-streaming-camera, published on or before Nov. 22, 2023 according to archive.org, accessed on Oct. 23, 2025, 30 pages.

OBSBOT Tiny 2 User Manual_EN, retrieved from URL: https://resource-cdn.obsbothk.com/download/obsbot-tiny-2/manual/OBSBOT%20Tiny%202%20User%20Manual EN.pdf, published on or before Jan. 16, 2024 according to archive.org, accessed on Oct. 23, 2025, 6 pages.

Support.apple.com, "Use Center Stage to keep you centered in the camera frame," retrieved from URL: https://support.apple.com/en-us/111102, published on or before Jan. 18, 2025 according to archive.org, accessed on Oct. 23, 2025, 4 pages.

* cited by examiner

PERFORMANCE RECORDING DATA BASED ON TEMPORAL ANALYSIS

BACKGROUND

This disclosure pertains generally to computer-implemented methods and systems for editing a recording of a live performance or other presentation and controlling a playback of the edited recording with significantly reduced workload compared to manual recording and editing techniques.

Recording a live performance using human-operated cameras and manually editing the footage is a process that begins well before the event itself. It starts with pre-production planning, where the production team reviews the script to identify key scenes, emotional moments, and transitions. From this, a shot list is developed, detailing how each segment of the performance will be covered. The team then decides on camera placement-usually two to four cameras are used. One camera is typically positioned at the back of the venue to capture a wide, uninterrupted view of the stage, while others are stationed at the sides or closer to the front to follow specific performers or capture close-up reactions.

Each camera operator is assigned specific roles, and, if possible, the crew conducts a rehearsal or walkthrough of the space. The setup includes configuring each camera for proper focus, exposure, and white balance, and ensuring they are timecode-synced or otherwise prepared for later synchronization. Audio is captured using a combination of lavalier microphones, boundary microphones placed on the stage, and, ideally, a direct feed from the venue's soundboard. A separate digital recorder may be used to ensure a backup of the audio.

On the day of the performance, the camera operators follow the action as rehearsed. The wide shot remains steady to ensure continuous coverage, while the other operators adjust their angles based on the live action. Communication through headsets is helpful to coordinate movement and minimize missed moments. Throughout the performance, battery levels and memory capacity are monitored carefully to prevent interruptions, and redundant recording methods are employed whenever possible.

After the performance ends, all footage and audio files are transferred to a central editing system. These are organized by camera angle and scene, then backed up to ensure nothing is lost. Editing begins with synchronizing the audio and video tracks, either by using timecodes or aligning waveforms manually. If the editing software supports it, a multicam sequence is created to streamline the editing process.

The editor assembles a rough cut by selecting the best angles for each moment, cutting between cameras to maintain visual interest and emotional continuity. Once the structure is solid, the fine cut refines the pacing, transitions, and audio levels. Titles and other graphic elements may be added at this stage, followed by basic color correction to ensure a consistent look across all camera angles. The audio is cleaned up and balanced to eliminate background noise and enhance clarity.

The final video is then rendered in the appropriate formats and reviewed by collaborators for feedback. After any last adjustments, the completed recording is exported for delivery or publication. This process, while labor-intensive, allows for full creative control and ensures a polished, professional final product that captures the energy and nuance of the live performance.

BRIEF DESCRIPTION OF THE DRAWINGS

Various features, aspects, and advantages are described below with reference to the drawings, which are intended for illustrative purposes and should in no way be interpreted as limiting the scope of the embodiments. Furthermore, various features of different disclosed embodiments can be combined to form additional embodiments, which are part of this disclosure. In the drawings, like reference characters can denote corresponding features throughout similar embodiments. The following is a brief description of each of the drawings.

DETAILED DESCRIPTION

Figure 1:
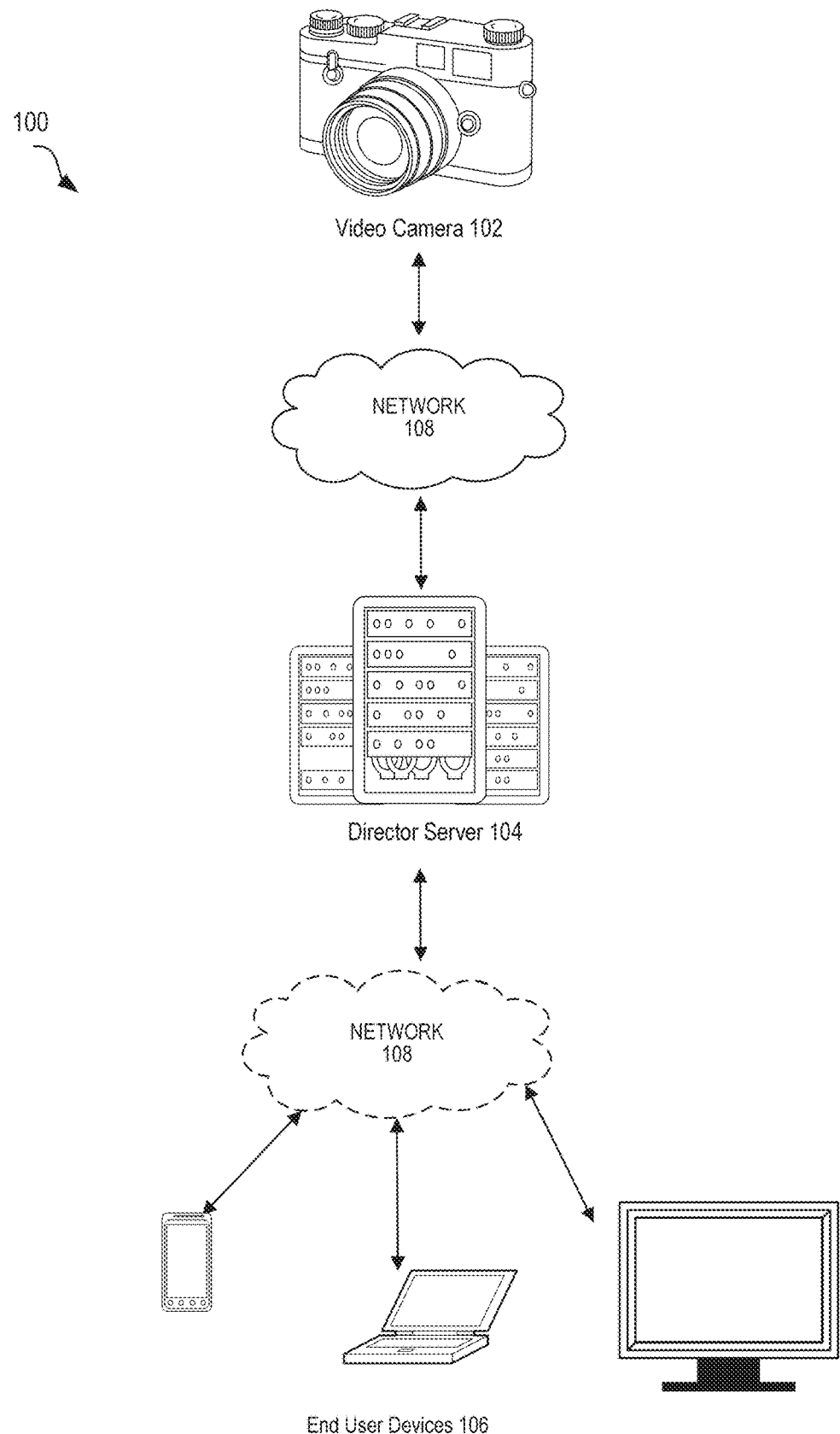
FIG. 1 is a diagram depicting the flow of data between the camera capturing the performance and the end user device.

The following description describes example embodiments, which are provided for illustrative purposes only. The present invention is not limited to the example embodiments provided below, and the example embodiments should not be considered to limit the present invention.

Generally described one or more aspects of the present application correspond to a computer implemented method for dynamic camera movements in a recording without the need for physical manipulation of the camera. Specifically, one or more aspects of the present application include systems and methods for recording an event, analyzing the visual elements of the event utilizing machine learning methods, analyzing the audio elements of the event utilizing machine learning methods, creating a heat map relating to the motion detected within the recording, and generating commands for presenting the video data given editing instructions by determining from the audio profile an index associated with a particular sound, associating an object within the video profile associated with the identified sound and generating a command for the display of the video data to apply an editing instruction to the object associated with the identified audio. Typical recordings for display are edited and presented well after the event being recorded has completed.

Audio-visual recordings for display have traditionally relied on a human editor to take the raw recording and implement edits manually to adjust the focus of the visual presentation throughout the recording. Relying on a human editor may pose difficulties when displaying a live performance, because a live performance would require edits to be made in real time. Live performances that are displayed to viewers require mechanical manipulation of the recording device to create a dynamic display. This nature of a live performance can force broadcasters to make a choice between a relatively static presentation to the viewer, one which lacks editing techniques, or a delay between the performance and the broadcast of the performance. This delay could take away from the experience of viewing a performance live.

In accordance with aspects, embodiments disclosed herein address the lack of dynamic display for event recordings without the use of mechanical camera manipulation by utilizing multiple machine learning models to generate a variety of profiles of a recording for analysis by a command selection process as it generates editing instructions for a display. For example, when recording a performance using traditional means, a user can face two options, neither of which are preferable. The viewer may choose to wait to watch the recording until an edited version has been released, or the viewer may view a recording in real-time, where there is a lack of dynamic camera motion in the display. As disclosed herein, there may be a variety of machine learning models used to analyze the recording and provide data to a command selector. For example, the system could receive a recording of a musical performance, and the system could respond by using machine learning models to create a profile of the video data in which each object within the display is classified and tracked throughout the recording, a profile of the audio data in which each audio source is identified and tracked throughout the recording, and temporal analysis of both the video and audio profiles in which all information is submitted to the command selector to determine a camera action at a specific time. For example, if during the performance there is a solo, the command selector may use the video and audio profiles and temporal analysis to identify the soloist and generate a command to zoom in on the performer during the solo.

Computing systems can use deterministic or machine learning (ML) algorithms to ingest data and make complex decisions based on the ingested information. A client computing system may request analysis of data by a service hosted in a remote computing environment over a communication network. The service may then ingest the data and generate a response based on an analysis that can include processing by one or more deterministic or ML algorithms. A server hosting the service, may provide a response to the client over the communication network, and the client may take additional action after receiving the response.

In some applications, the ML models can be a Convolutional Neural Network. Convolutional Neural Networks (CNNs), in general is a subset of ML model that is particularly well suited for analyzing visual data. CNNs have a series of layers, each of which detects different features of an input image. The number of layers can vary depending on the complexity of the intended purpose. The initial layers are often used to detect simpler features. For example, in image detection, the initial layers may be used to detect lines or simple textures. The deeper layers of the CNN can be used to detect more complex features such as specific shapes. In the final layers of a CNN, the model makes a final decision, for example, classifying an object within an image based on the output from the previous layers. In a common application, CNNs can be used to identify objects within an image. For example, a CNN can be configured to receive an image of the stage at a concert and identify every instrument being played. In this example, the CNN can receive an image from a user and provide its output corresponding to the generated output from the layers within. For example, the CNN can utilize an interface to receive the data from user inputs and provide its output corresponding to the generated output from the deep learning model.

In some applications, ML models can implement a CNN that receives audio data, and processes that data to identify sources of the audio. For example, the CNN may receive as input, a conference call, and further process the performance into an identification of each audio source. In one common application, the CNN may be used to identify various speakers during the conference call.

As described herein, a system can generate a video profile that enables accurate analysis of video data from a video recording. A video recording may be a stored representation of visual images and accompanying sound that has been recorded and preserved. A video recording may include visual data, audio data, and a storage medium to store the visual and audio data. In accordance with aspects there may be varying degrees of specificity in the video profile. The video profile may be generated by extracting video data from a video recording, where the video data comprises image sequences depicting movements, gestures, facial expressions, positions, and interactions of the objects in the frame. Image sequences may be multiple still images shown in rapid succession. A facial expression may be an arrangement of facial muscles that convey emotions, intentions or reactions. Facial expressions may include but are not limited to a smile, a frown, a scowl, widened eyes, open mouth, a furrowed brow and more. Image sequences in combination with a sufficient frame rate, may blend the multiple still images together to produce the perception of continuous motion. The system may perform computer vision techniques to identify and track individual objects within the video data. Individual objects may include individual performers. Individual performers may be but are not limited to any person or object that is part of a performance. Individual performers may be a person or object that is distinct from other performers. For example, a performance of a vocalist, drummer, and guitar player may have 3 individual performers. Individual performers may be but are not limited to a vocalist, instrumentalist, or dancer. These computer vision techniques may include the use of a convolutional neural network (CNN). These CNNs can work in a variety of ways, for example, the CNN may have three modules, one for region proposal, one to operate as a feature extractor, and a third to act as a classifier. In this example the region proposal module may generate and extract category independent region proposals (candidates for bounding boxes). The feature extractor may use a CNN to extract features from each bounding box. Finally, the third module may classify each of the features as a known class. In another embodiment, the input image may be passed through a CNN to extract features from the image. These features may then be passed through a series of fully connected layers, which predict class probabilities and bounding box coordinates. The image may then be divided into a grid of cells, where each cell is responsible for predicting a set of bounding boxes and class probabilities. The network outputs a set of bounding boxes and class probabilities for each cell. These bounding boxes may be filtered down using a technique called non-max-suppression which removes overlapping boxes and chooses the box with the highest-class probability. The final output in this embodiment is a set of predicted bounding boxes and class labels for each object in the image. For example, if an image of a band on stage is sent to this object classifier, it will first extract features from the image, then overlay a grid on top of the image. Each cell in the grid will create a set of bounding boxes with confidence scores that an object exists in the cell, and a class probability map for each cell. In this example, several bounding boxes may be generated around the performers and their instruments, along with a confidence score for how well the bounding box contains the object and a score for how accurate the model believes its object classification is. After these boxes are generated, the model will implement a non-max-suppression technique to eliminate redundant boxes. For example, if multiple boxes overlap on a guitar, the model will only keep the box with the highest confidence scores for the bounding box and image classification. These filtered boxes may be returned to identify and track individual objects within the video data. In some embodiments the model may use the identified objects to generate a video profile comprising spatial reference points, where the spatial reference points are associated with the identified objects.

As described herein, a system can generate temporal analysis of a recorded performance by using a machine learning model or a deterministic model to classify movements, gestures, positions, interactions of the objects, or other actions associated with motion, and determining a visual context of the recording based on the classified motion, and identifying intervals of peak motion associated with each identified object. For example, if the video recording is of a live musical performance, the model may classify movements within the recording such as a drummer hitting a drum, or a singer's face as they perform a solo. In the live performance example, the model can determine a visual context by evaluating the amount of motion by each object identified, and the type of motion that is identified. For example, the model can determine that there is a solo performance when only one instrument or vocal performer shows motion above a threshold amount. A visual context may be a heatmap of motion within the recording. The model may then identify intervals of peak motion associated with each of the identified objects. For example, in a musical performance, the model may identify a drum solo due to the increased motion detected at a specific interval when compared with the rest of the performance.

As described herein, a system can generate an audio profile that enables accurate analysis of the audio data. The audio profile may be generated by extracting audio data from an audio recording, where the audio data includes at least one of vocals, instrumentals, bodily percussion, or anything else that could be a source of sound. An audio recording may be a captured and stored representation of sound. An audio recording may include audio data, and a storage medium to store the audio data. An audio recording may be recorded with one or more audio recording devices. One or more audio recording devices may include but are not limited to field recorders, smartphones, microphones, lavalier microphones, or built-in camera microphones. In some embodiments, the one or more audio recording devices are built into the one or more video recording devices. For example, if the one or more video recording devices are smartphones, the one or more audio recording devices may be the built in recording device in the smartphones. In some embodiments, the one or more audio recording devices may be separate from the one or more video recording devices. For example, the one or more audio recording devices may be microphones, while the one or more video recording devices are DSLR cameras. In accordance with aspects there may be varying degrees of profile specificity. The video profile may be generated by extracting video data from a video recording, where the video data comprises image sequences depicting movements, gestures, facial expressions, positions, and interactions of the objects in the frame. The system may perform audio recognition techniques to identify and track individual audio sources within the audio data. These audio recognition techniques may include machine learning methods. In some embodiments the machine learning model may be a hidden Markov model. In some embodiments the machine learning model may be a Gaussian mixture model. In some embodiments, the machine learning model may be a deep neural network. In some embodiments the machine learning model may be a recurrent neural network. In some embodiments the machine learning model may be a convolutional neural network. For example, the system can utilize a hidden Markov model to identify and track each unique voice throughout a play.

As described herein, a system can generate an audio temporal analysis of a performance using an additional machine learning model specifically trained on audio data representing various performance scenarios to classify within the audio profile at the elements that could be indicative of sound. For example, if the audio data relates to a musical performance, the system may generate a temporal analysis describing when each instrument is being played utilizing the additional machine leaning model to classify the sounds that belong to a guitar being played, the sounds belonging to a vocalist, and the sounds belonging to a set of drums. The various performance scenarios may refer to different arrangements of instruments within a band. For example, the various performance scenarios may refer to a band with one vocalist, one guitar player, and one drummer, or two vocalists and a guitar player. In some embodiments the various performance scenarios may include a play, or a speech. In some embodiments, the various performance scenarios may refer to specific moments within a performance. For example, one of the various performance scenarios may refer to a vocal solo, while another of the various performance scenarios may refer to all performers generating audio at the same time. In some embodiments, a system can generate audio temporal analysis of a performance using the machine learning model trained on video data to infer different audio sources. For example, the system may be able to infer that there is a guitar solo using only the video data and the video machine learning model by identifying a time period associated with high motion in a region of interest that includes a guitar, where the other regions of interest have low values associated with motion. In another example, the video data can be used to infer multiple audio sources such as a vocalist, guitarist, and drummer, by assessing the amount of motion within each region of interest associated with those performers and where the motion is indicative for each performer singing/playing their instrument. In some embodiments, the inferences made from the video data and the video machine learning model can be used rather than additional machine learning model specifically trained on audio data.

In accordance with aspects, the system may determine the auditory context of the live performance based on the classified sounds and generate a temporal analysis by identifying intervals of activity associated with the identified sounds. An auditory context may include labels of specific moments within the audio data to describe the data. For example, if the audio recording is of a live musical performance, the audio context may classify sounds within the recording such as a drum solo or a vocal solo. In the live performance example, the model can determine an auditory context by evaluating the amount of volume of each identified audio source, the type of audio that is identified, as well as other audio sources identified at that time interval. For example, in the context of a musical performance, auditory context may indicate that there is a drum solo when there is only one audio source identified and it is associated with a drum.

In accordance with aspects, the system may determine an audio and video profile which in turn are used to generate an auditory temporal analysis and video temporal analysis to aid in determining editing commands. For example, the video profile can be generated by extracting video data from the video recording, where video data comprises image sequences, applying computer vision techniques to identify and track individual objects within the video data, and generate a profile with a plurality of spatial reference points associated with the identified objects. The video data may include but not be limited to image sequences. Image sequences may consist of multiple still images shown in rapid succession. The video temporal analysis may be a heat map and can be generated for example by classifying within the video profile, movements, gestures, or other indications of motion, and using a specially trained machine learning model to determine the visual context of the objects in the video profile; and identify intervals of peak motion associated with each identified object. In some embodiments the audio profile can be generated by receiving an audio recording of an event, extracting the audio data from the audio recording where the audio recording includes vocals, instrumentals, bodily percussions, or anything else indicative of sound, and applying audio recognition techniques to identify and track an individual audio source within the audio data and generating an audio temporal analysis by using a machine learning model to classifying the vocals, instrumentals, bodily percussions, or other elements indicative of sound. Bodily percussions may refer to the act of creating sounds using the human body as an instrument. Bodily percussions may involve using parts of the body such as hands, feet, chest, and thighs to produce percussive sounds. For example, bodily percussions may include but are not limited to clapping, patting, stomping, snapping, or slapping. For example, bodily percussions could include a performer clapping along with the beat of a song. In some embodiments, an auditory context is then determined at specific intervals based on the classified audio, and an audio temporal analysis is identified by determining intervals of activity associated with each of the unique classified audio sources. In some embodiments, the specific intervals may be a time interval such that there is a whole number of specific intervals that fit within the total time of the audio profile. For example, if the audio profile has a length of one minute, a specific interval may be once every 5 seconds from the start of the audio profile until the end. In some embodiments, the specific intervals can change throughout the audio profile. For example, the specific interval may start at once every five seconds, and then sped up to once every second. In some embodiments, the specific interval may be predetermined. For example, the specific intervals may be set to every second for any audio profile. In some embodiments, the specific intervals may be determined based on the audio data.

As will be appreciated by one of skill in the art in light of the present disclosure, the embodiments disclosed herein improve ability to display presentations by creating a system capable of generating a dynamic display of an event through the use of a video profile of the performance generated through a machine learning algorithm, a machine learning algorithm to generate a video temporal analysis, a machine learning algorithm to generate an audio profile of the performance, a machine learning algorithm to generate an audio temporal analysis, and analyzing the profiles and temporal analyses to generate commands for a dynamic display to be presented to a user in near real time as the event occurs. Moreover, the presently disclosed embodiments address technical problems inherent within computing systems; specifically, the difficulty in analyzing an audio-visual recording in real time, or near real time, and generating commands to adjust the manner in which the recording is displayed to a user. These technical problems are addressed by various technical solutions described herein, including the variety of machine learning algorithms trained specifically on object detection, audio identification, and temporal analysis, the method of generating commands for presenting the video data, utilizing a structured content container, built to comprise video data, audio data, and commands, and transmission of the structured content creator to a user device.

The foregoing aspects and many of the attendant advantages of this disclosure will become more readily appreciated as the same become better understood by reference to the following description, when taken in conjunction with the accompanying drawings.

FIG. 1 depicts the data flow 100 through the director server 104 in which embodiments of the present disclosure can be implemented. The director server 104 can be accessed by a video camera 102 or user device(s) 106 over a network 108. The director server 104 may be part of a cloud provider network (sometimes referred to simply as a "cloud") or another type of networked computing environment, which can include a pool of network-accessible computer resources (such as compute, storage, and networking resources, applications, and services), which may be virtualized or bare-metal. The networked computing environment can provide convenient, on demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

The director server 104 may implement various computing resources, including data processing services (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated).

In FIG. 1, the director server 104 is connected to two different devices via the network 108. The director server 104 is connected to the video camera 102 and the end user devices 106. The video camera 102 may be used to provide the director server 104 with audio-visual data to process. The end-user device 106 may receive the audio-visual data from the director network, along with editing commands to manipulate the display of the audio-visual data.

A video camera 102 corresponds to any device that provides functionality for capturing and recording audio and video and can save or transmit that recorded data. A video camera 102 may be, but is not limited to, a camcorder, a smartphone camera, a digital single lens reflex (DSLR) camera, a cinema camera, or an action camera such as a GoPro. Video recording devices may be a device designed to record and store video and audio data. Video recording devices may be, but are not limited to, a camcorder, a smartphone camera, a digital lens reflex (DSLR) camera, a cinema camera, or an action camera such as a GoPro. A video camera 102 may be a video recording device. In some embodiments there can be more than one video camera 102 where each video camera 102 is placed in different positions to capture multiple angles of recording. In some embodiments, there can be more than one video camera 102 where each video camera does not need to have a unique position relative to the other video cameras 102. In some embodiments there can be one video camera 102 in a position to capture the live performance. In some embodiments, there can be a video camera 102 in a position to capture various stage areas. In some embodiments, there can be multiple video cameras 102 to capture multiple stage areas. Stage areas may include, but are not limited to, the entire stage, downstage, upstage, center stage, stage right, stage left. In some embodiments, stage areas can refer to the area where a performance takes place. For example, the stage area may be an open field or a place on the sidewalk that the performers occupy during the performance. In some embodiments the stage areas do not need to have a physical stage. In some embodiments, there can be a video camera 102 in a position to capture audience reactions, including but not limited to facial expressions, clapping, and laughing. Facial expressions may be an arrangement of facial muscles that convey emotions, intentions or reactions. Facial expressions may include, but are not limited to, a smile, a frown, a scowl, widened eyes, open mouth, a furrowed brow and more. Audience reactions can include any action that a member of the audience does in response to the event they are watching. In some embodiments, there can be more than one video camera 102 in a position to capture audience reactions at different areas of the audience. For example, there can be a video camera 102 positioned to capture audience reactions of the entire audience, and there can be a video camera 102 positioned to capture audience reactions of specific members of the audience. In some embodiments, there can be a video camera 102 in a position to capture audience reactions, and a video camera 102 in a position to capture at least one of the stage areas.

In some embodiments a video camera 102 may correspond to a device with a plurality of optical frontends that are connected to a singular processing backend. In some embodiments, the plurality of optical frontends may capture a recording simultaneously, and the singular processing backend may process the video feed from each of the multiple optical frontends at the same time. For example, the video camera 102 may be a smartphone device that has multiple cameras, where each of the cameras on the smartphone is one of the multiple optical frontends, and the smartphone itself is the processing backend. In some embodiments, each of the multiple optical frontends may have different lenses, and the processing backend may implement editing instructions that dynamically shift between the plurality of optical frontends. For example, the processing backend may implement editing instructions to shift the recording displayed from one optical frontend to the recording displayed from another in order to maintain a minimum image resolution. In some embodiments, the plurality of optical frontends may have lenses including but not limited to a telephoto lens, a wide lens, and an ultrawide lens. In some embodiments, the plurality of optical frontends each have a unique perspective due to varying optical centers and focal lengths. In some embodiments, the plurality of optical frontends may enable the processing backend to dynamically shift the perspective of a broadcast by shifting to a video feed of a different optical frontend of the plurality of optical frontends.

An end user device 106 illustratively corresponds to any computing device that provides functionality allowing for a user to interact with components of the network 108, such as communicating with the director server 104. User devices 106 may include user interfaces or dashboards that connect a user with a machine, system or device. In various implementations, a user device 106 includes computer devices with a display and mechanism for user input (e.g., mouse, keyboard, voice recognition, touch screen, and/or the like). For example, the user device 106 includes a personal computer, desktop, tablet, e-reader, server, wearable device, laptop or tablet computer, smartphone, gaming consoles, personal digital assistant (PDAs), hybrid PDA, mobile phone, electronic book reader, set-top box, voice command device, camera, digital media player, and the like. A personal computer may be a general-purpose computing device designed for use by an individual. The user device 106 can access the network 108 to communicate with the director server 104.

The network 108 can include any appropriate network, including wired network, wireless network, or combination thereof. For example, network 108 may be a personal area network, local area network, wide area network, cable network, satellite network, cellular network, or any other such network or combination thereof. As a further example, the network 108 may be a publicly accessible network of linked networks, possibly operated by various distinct parties, such as the Internet. Protocols and components for communicating via the Internet or any other types of communication networks are known to those skilled in the art or computer communications and thus, need not be described in more detail herein. In various embodiments, the network 108 may be a private or semi-private network, such as a corporate or university intranet. The network 108 may include one or more wireless networks, such as a Global System for Mobile Communications (GSM) network, a Code Division Multiple Access (CDMA) network, a Long-Term Evolution (LTE) network, C-band, mmWave, sub-6 GHZ, or any other type of wireless network. The network 108 can use protocols and components for communicating via the Internet or any of the other aforementioned types of networks. For example, the protocols. Used by the network 108 may include Hypertext Transfer Protocol (HTTP), HTTP Secure (HTTPS), Message Queue Telemetry Transport (MQTT) Constrained Application Protocol (CoAP), and the like. Protocols and components for communicating via the Internet or any of the other aforementioned types of communication networks are well known to those skilled in the art of computer communication and thus need not be described in more detail herein.

In various implementations, the network 108 can represent a network that may be local to a particular organization, e.g., a private or semi-private network, such as a corporate or university intranet. In some implementations, devices communicate via the network 108 without traversing an external network, such as the Internet. Devices connected via the network 108 in this case may be walled off from accessing the Internet. As an example, the network 108 may not be connected to the Internet. Accordingly, the user device 106 may communicate with the director server 104 directly (via wired or wireless communication) or via the network 108, without using the Internet. Thus, even if the network 108 or the Internet is down, the director server 104 continues to communicate and function via direct communications (and/or via the network 108)

Figure 2:
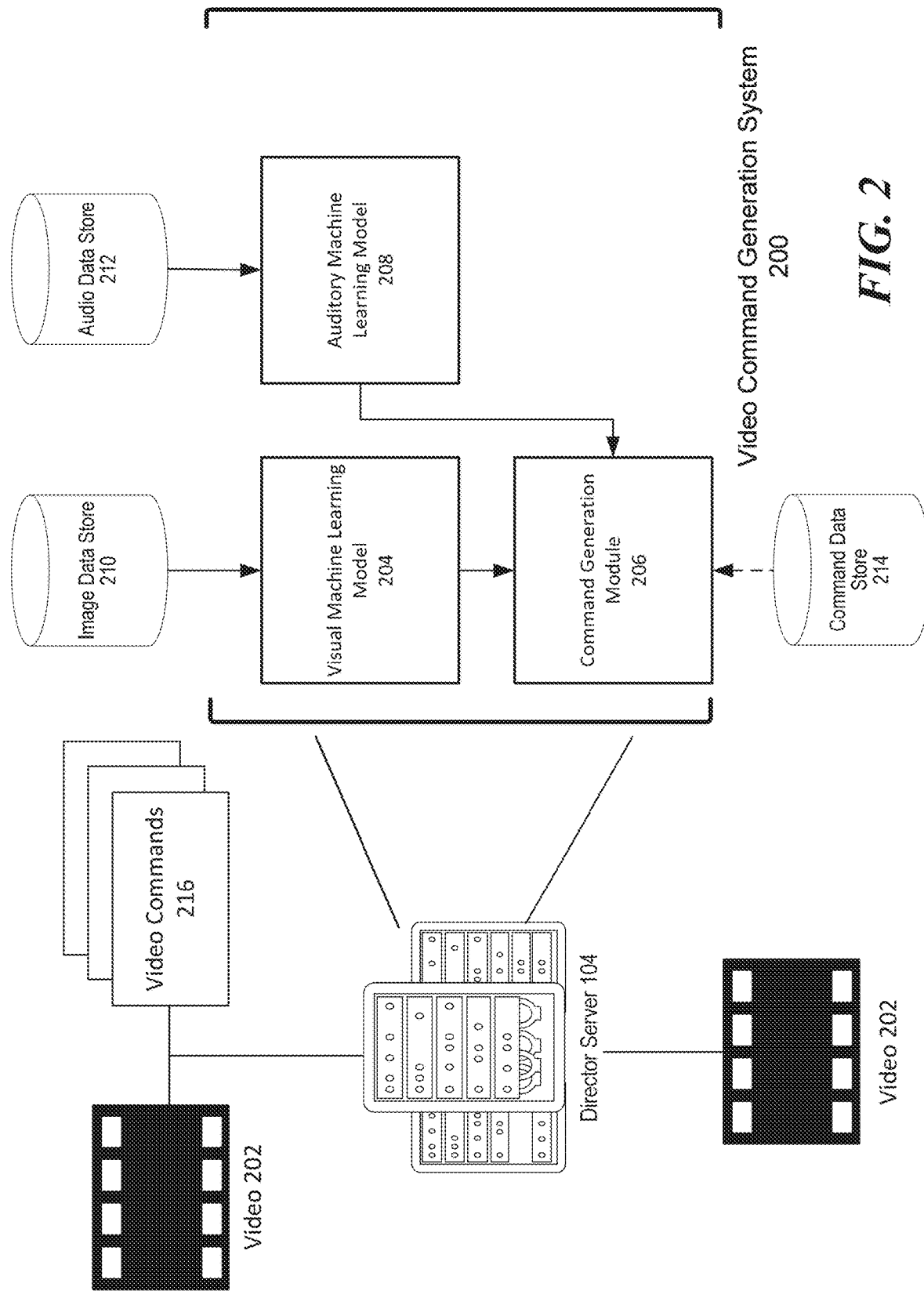
FIG. 2 is a diagram depicting a director server receiving audio-visual data and analyzing it to generate editing commands.

FIG. 2 shows that the director server 104 includes one or more components for implementing (alone or in combination) the various methodologies described herein. Such components include a video command generation system 200, which can include an image data store 210, an audio data store 212, a visual machine learning model 204, an auditory machine learning model 208, a command generation module 206, and a command data store 214. Additionally, FIG. 2 shows the video 202, and the combination of the video 202 and the video commands 216.

The video 202 may be a recording, reproduction, or broadcast of moving visual images. The video 202 may include a recording, reproduction, or broadcast of auditory elements in addition to the moving visual images. The video 202 may be an audiovisual recording involving the use of recorded pictures and sound.

The visual machine learning model 204 may be configured to receive data from the video 202 and process it to identify people and objects within an image to create a video profile with spatial reference points and create a video temporal analysis by tracking the motion associated with the identified people and objects over time through successive video frames.

The auditory machine learning model 208 may be configured to receive data from the video 202 and process it to identify and classify audio sources within the audio data to create an audio profile with temporal reference points, and create an audio temporal analysis by identifying intervals of activity associated with each audio source throughout the audio data creating an audio profile in the process.

The image data store 210 may be configured to store the data used to train the visual machine learning model 204. The image data store 210 may be any variety of storage devices, such as a hard disk drive, or solid-state drive.

The audio data store 212 may be configured to store the data used to train the auditory machine learning model 208. The audio data store 212 may be any variety of storage devices, such as a hard disk drive, or solid-state drive.

The command generation module 206 may be configured to analyze output from either the visual machine learning model 204, the auditory machine learning model, or both and generate editing commands to perform on the video 202. The command generation module may analyze the video temporal analysis, video profile, audio temporal analysis, and audio profile, generated by the visual machine learning model 204 and the auditory machine learning model 208 respectively and generate a command based on the auditory context and visual context for a first time associated with vocalization and a performer associated with that vocalization. The command generation module 206 may also generate commands based on a second time associated with a sound where there is no vocalization and identify an object in the video profile associated with that sound. In some embodiments, when the second object is determined to not be unique within the video profile, identify the object that is correctly associated with the sound by identifying an interval of peak motion associated with the second time. In some embodiments, the command generation module 206 may be trained with data from the command data store 214 to generate different commands based on the video profile and audio profile provided by the visual machine learning model 204 and the auditory machine learning model 208. In some embodiments the commands can include editing instructions including but not limited to cropping, scaling, rotating, or panning in relation to reference points stored in the video profile and audio profile.

In some embodiments, the command generation module 206 may be configured to rely solely on the video profile to generate different editing commands. In some embodiments, the command generation module 206 may rely on the video profile and the audio profile without the visual temporal analysis to generate the different editing commands. In some embodiments, the command generation module 206 may use any combination of video profile, audio profile, video temporal analysis, and audio temporal analysis to generate the different editing commands. For example, the command generation module 206, may rely solely on the video profile and the visual temporal analysis to generate commands. In this example, the command generation module 206 may make decisions solely based on the visual context from the video temporal analysis which may result in focusing on an area of peak motion even if that is not the main source of audio at the given time. In this context, if the command generation module 206 is generating commands for a musical performance, the commands may be directed to focus the camera on a performer dancing around the stage rather than a different performer singing a solo at the same time.

A command to crop the visual data can be the process of removing or adjusting the outside edges of the image. This can be done to improve the framing of an image, change the aspect ratio of the image, or accentuate or isolate subject matter from the background. In one embodiment, a command for scaling can refer to capturing video data at one resolution, and presenting the video data at a different resolution using an interpolation algorithm. In some embodiments, scaling the video data can rely on at least one of the following: new edge-directed interpolation (NEDI), edge-guided image interpolation (EGGI), iterative curvature-based interpolation (ICBI), or directional cubic convolution interpolation (DCCI). A command for scaling an image can refer to increasing or decreasing the size of the image as it is displayed. For example, in a photograph of a group of people, a command to scale the image up on a particular person in the photo can increase the scale of the subject and therefore make them appear larger within the frame. This may result in parts of the image further away from the magnified subject being cut off. In another example, there can be a command to decrease the scale, which results in the objects and subjects within the image appearing smaller. A command for rotating the video can refer to changing the orientation of the image. In some embodiments, the command to rotate can refer to turning the display video around a fixed point by a specific angle. In some embodiments, the fixed point may be the center of the video. For example, if the command implementation module 304 received a command to be rotated 180 degrees, it would appear upside-down. A command for panning over the image can refer to horizontal or vertical movement from one side of the image to the other. In some embodiments, a command for panning can refer to a crop with an additional time dimension. For example, a command to pan to a vocalist may have the same resulting end frame as the command to crop to a vocalist, the difference being that the pan command will incorporate a time element where the video incrementally shifts to a region of interest as opposed to an instantaneous shift accomplished through a crop.

Figure 3:
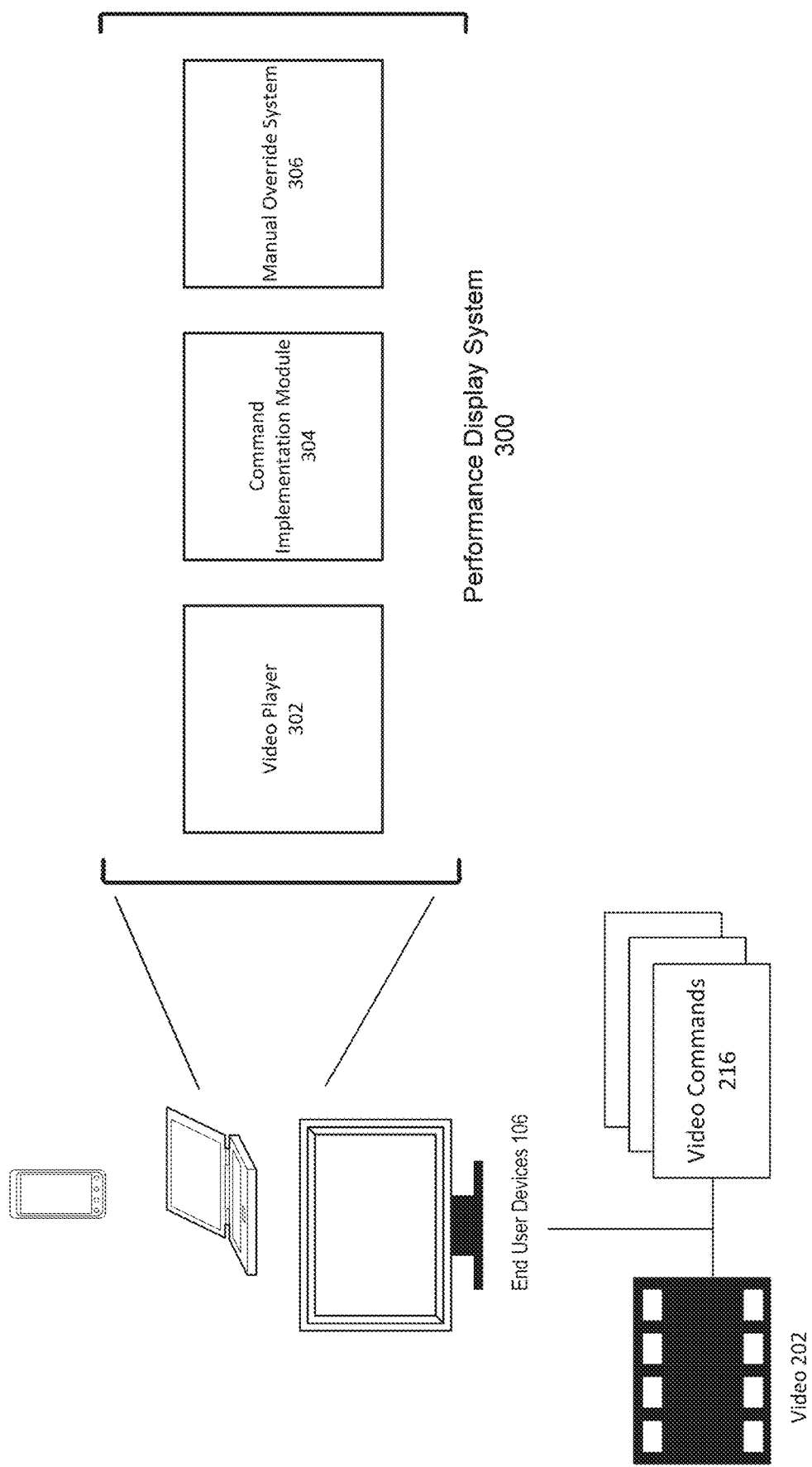
FIG. 3 is a diagram depicting an end user device displaying a video along with the video commands received from the director server.

FIG. 3 depicts the performance display system 300 on the end user device 106 as the end user device 106 receives the video 202 and the video commands 216. The end user device 106 may receive the video 202 and the video commands 216 within a structured content container. In some embodiments, the structured content container may be a multimedia container file that can hold multiple data streams such as video, audio, metadata, and additional data within a single file. In some embodiments the structured content container may organize multimedia elements into a cohesive format to facilitate processing, retrieval, and interaction. In some embodiments, the additional data within the structured content container may be video commands. In some embodiments the structured content container may be a container format such as MP4, MKV, AVI, or MOV.

As shown in FIG. 3, the performance display system 300 includes a video player 302, a command implementation module 304, and a manual override system 306.

The video player 302, may be hardware or software that enables the end user device 106 to play back the video 202. In various implementations the video player 302, may include hardware devices such as a CD player, or DVD player, or software such as QuickTime Player, Windows Media Player, or VLC media player. The video player may utilize a display on the end user device 106 to display a video to the user.

The command implementation module 304 can be configured to intermediate between the video player 302 and the video 202 and video commands 216. The command implementation module 304 can handle video commands 216 from the director server 104. In some embodiments, the command implementation module may be an application such as iMovie, or Adobe Aftereffects. The command implementation module 304 may take the video commands 216 and the video 202 and perform the video commands 216 on the video 202 before presenting the adjusted video to the video player 302. For example, the command implementation module 304 may take the video 202 of a musical performance and video commands 216 such as "scale up on vocalist", "rotate image 90 degrees" and perform those actions on the video 202 prior to sending the video 202 to the video player 302. The result being that the video player 302 on the end user device 106 displays a video where the display has scaled up on a vocalist in the performance and the image has been rotated 90 degrees.

Figure 4:
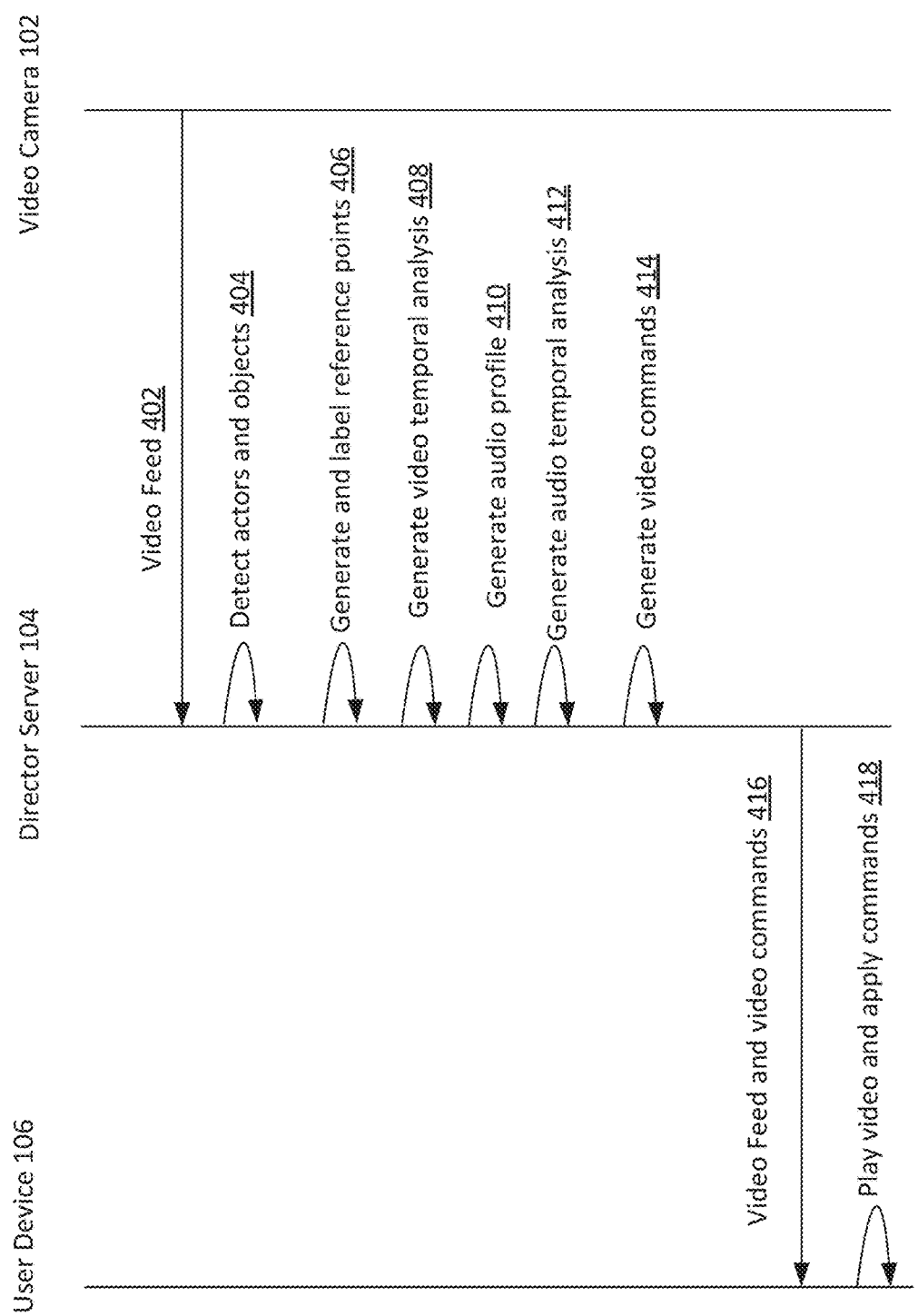
FIG. 4 is a diagram depicting an example routine for processing a video captured by a video camera and presenting it to a user device.

FIG. 4 is an example routine 400 for capturing and processing a video feed, analyzing it, generating video commands based off the analysis, and playing the video with the video commands applied for a user.

A director server 104 receives a video feed 402 from a video camera 102. The director server 104 utilizes computer vision techniques to detect people and objects within the video at step 404. These computer vision techniques can detect and classify people and objects, as well as specific body parts on a person such as their face or their arms. For example, if the video feed is of a musical performance including a vocalist, a drummer, and a guitarist, the computer vision techniques can detect the three individual performers, the faces of the performers, the drum set, and the guitar.

At step 406 the director server 104 may generate and label references points as part of the video profile of the video feed 402. These reference points may be spatial reference points associated with identified objects and people within the video feed 402. These reference points may be bounding boxes around each of the objects or people in the frame. A bounding box is a rectangle drawn around a region of interest in an image. The region of interest corresponds to the region of interest of the image. For example, if the video feed 402 depicts a band performing a song, the director server 104 may generate bounding boxes around the instruments that are being played such as the drum set, and guitar, and the director server 104 may also generate bounding boxes around the musicians. These bounding boxes can be interpreted as predictions from a computer vision technique to visualize the results of the model identifying the objects within the frame. The bounding boxes may be accompanied with labels for each box that describe the type of object or person that is the region of interest within the bounding box. For instance, if a bounding box contains a vocalist's face, the box may also contain a label denoting that the region of interest is a vocalist as opposed to some other object like a guitar. In some embodiments, spatial reference points may correspond to a body, an upper body, or a mouth of one or more performers. For example, there may be multiple spatial reference points associated with a vocalist, with one covering their entire body, a second only covering their upper body, and a third covering their mouth. In some embodiments, the spatial reference points may correspond to one or more portions of the one or more objects in the video profile. For example, there may be multiple spatial reference points associated with a guitar, where one spatial reference point encompasses the pick guard and sound hole, while another spatial refence point covers the neck and fretboard. In some embodiments, the upper body may refer to waist up. In some embodiments, the upper body may refer to the shoulders and above.

At step 408 the director server 104 may generate a video temporal analysis utilizing the references points generated at step 406. The director server 104 using a machine learning model trained on annotated video data, may classify motion and relative position of the identified persons or instruments. In some embodiments annotated video data may be video data that has labels for each of the objects that appear in the video data. For example, the annotated video data may include labels such as "drums", and "singer" for a drum set and vocalist respectively. In some embodiments the annotated video data can have additional details such as labels for specific facial expressions, or specific labels for types of objects, for example "electric guitar" and "acoustic guitar". In some embodiments, the annotated video data may be generated by a person. For example, a person may review the video data and add labels and annotations for the objects that appear in the video. In some embodiments, the annotated video data may be generated by a different machine learning model. In some embodiments motion may include but not be limited to movements, gestures, facial expressions, and interactions. The director server 104 can identify intervals of peak motion associated with each of the identified persons or objects. For example, the director server 104 may generate a heatmap to track the motion of each identified region of interest within the frame, and associate specific times throughout the recording with specific regions of interest based on a peak motion value determined by a heatmap. In some embodiments, a heatmap may be generated by tracking the changing pixel values over time within each region of interest. For example, when the system has identified a drum set as an area of interest, the changes in the pixels contained within the drum set region of interest over the course of a performance to identify periods of high motion and low motion. In this example, when the drummer is less active in a song, the heatmap will reflect low motion because the pixel values within the region of interest will remain relatively static. However, when the drummer has a more active role in the song, the heatmap map will reflect this by showing the changes in pixels associated with the drummer moving their hands and drum sticks. In some embodiments, a heatmap may be generated based at least in part on the spatial reference points within the video profile. The director server 104 may use the heatmap to identify intervals of peak motion associated with each of the identified region of interest by tracking the changes in the pixels of each region of interest over time. For example, if the video feed 402 is of a musical performance, during a drum solo, the temporal analysis may identify the drums as a pertinent region of interest at that specific time due to the peak values of changes in pixels associated with the drum set region during that time.

At step 410 the director server 104 may generate the audio profile from audio data extracted from the video feed 402. The audio profile generated by applying audio recognition techniques including but not limited to gaussian mixture models, hidden Markov models, and deep neural networks. The audio recognition techniques can be used to identify and track an individual audio source from within the recording. For example, for an audio recording of two people speaking, the audio recognition techniques can identify and track the two unique voices throughout the entire recording. The audio profile may also contain temporal references points that are associated with each of the identified audio sources within the audio data.

At step 412 the director server 104 may generate the audio temporal analysis from the audio profile generated at step 410. The audio temporal analysis using a machine learning model trained on annotated audio data may classify each audio source within the audio profile and determine an audio context of the audio data based on the classified audio sources. In some embodiments annotated audio data may be audio data that has labels for each of the sounds that are recorded in the audio data. For example, the annotated audio data may include labels such as "drums", and "singer" for a sounds associated with a drum and vocalist respectively. In some embodiments the annotated audio data can have additional details such as labels for specific voices, or instruments, for example "electric guitar" and "acoustic guitar". In some embodiments the annotated audio data may provide additional information such as the tempo of a song, or the genre of music that is within the audio. For example, the annotated audio data may note that the audio is related to a rock concert. The director server 104 at step 412 may then complete the temporal analysis by identifying intervals of activity associated with each of the identified audio sources. For example, in the context of a musical performance, the director server 104 may analyze the audio data and notice intervals where all instruments and vocalists are generating sound and also determine time intervals where only a single instrument is generating audio and note those time intervals along with the previously identified audio source.

At step 414 the director server 104 may generate commands for presenting video data to the end user device 106. The commands may be generated using a command selection process where the director server 104 determines from the audio profile, a first time period associated with a vocalization. The system may then identify a classified object or person associated with the vocalization. For example, the system may associate a classified object or person with a vocalization by determining a temporal reference point within the audio profile associated with a solo vocal performance, and determining a spatial reference point within the video profile that has a peak motion at the same time as the temporal reference point. For example, if there is a solo vocal, the audio profile will have a temporal reference point associated with the vocal at a given time, the system can retrieve spatial reference points the video profile at the time associated with the temporal reference point and select a spatial reference point with peak motion, as no other instruments or vocalists will have motion during a solo performance. The command selection process may also identify within the video profile a different time index associated with an audio source that is not a vocalization where the object or person associated with that audio source is identified either by finding an interval of peak motion from the video temporal analysis associated with the different time index and associating the object identified as the motion source with the audio source when it is determined that identified audio source is not unique within the video profile. For example, the command selection process may identify with the video profile a time index of an instrumental performance. An instrumental performance may refer to a solo instrument performing. An instrumental performance may refer to multiple instruments playing. In some embodiments, an instrumental performance may have more than one of the same instrument while only one is generating audio at a specific time index. In the aforementioned case, the command selection process may utilize an instrumental performer identification process. The instrumental performer identification process may use the video profile to determine which of the identical identified instruments is the audio source at a specific time index. For example, if at the different time index, the audio profile determines that the sound of a guitar is playing, but there are two guitars in the video profile, the command selection process will use an instrumental performer identification process to evaluate the video temporal analysis at the given time index and use the reference associated with peak motion as the reference point to which editing commands should refer. In some embodiments, the command selection process may associate an identified vocal or instrumental in the audio profile with an identified performer or instrument in the video profile by matching the identified vocal or instrumental to a corresponding identified instrument or performer when the identified vocal or instrumental is unique within the video profile. For example, the command selection process may associate audio of a guitar with a performer holding a guitar identified in the video profile when there is only one guitar in the video profile. In some embodiments a corresponding identified instrument may mean an instrument that is the audio source for a given sound. A time index may refer to a timestamp, for a specific point in the video profile or audio profile that the command selection process has identified.

In some embodiments, the editing commands can include, but are not limited to, instructions for cropping, scaling, rotating, or panning in relation to the reference points stored in the video profile and the audio profile.

In some embodiments, the commands may be generated using a pre-determined command format, where the predetermined command format includes a command selection process. In some embodiments, the command selection process considers, the audio profile, a first time index associated with a vocalization, a heatmap, and a timer. In some embodiments, the pre-determined command format may include editing instructions comprising: instructions for cropping, scaling, rotating, or panning in relation to a plurality of spatial reference points and the plurality of temporal reference points based on a weighting system for the plurality of spatial reference points and the plurality of temporal reference points. For example, the editing instructions in the pre-determined command format may comprise instructions for panning from a vocalist to a guitar player at a temporal reference point associated with the start of a guitar solo. In some embodiments, the command selection process comprises a first time period, where the first time period defines the length of time between execution of pre-determined commands. In some embodiments, the command selection process generates a command for every time index that corresponds to a multiple of the time periods. In some embodiments, every time index refers to all time indexes that exist within the video profile or audio profile. In some embodiments, the command selection process cannot generate a command for a time index until the next multiple of the time period. For example, when the command selection process considers a first time period of 5 seconds, the command implementation module 304 will be required to wait 5 seconds before implementing the next pre-determined command. In some embodiments, the command selection process comprises a second time period, where the second time period defines the length of time to execute a pre-determined command. For example, the command selection process may comprise a second time period of 2 seconds, and upon receiving the pre-determined command to pan to a vocalist, the command implementation module will pan to the vocalist over a period of time of 2 seconds. In some embodiments, the command selection process may consider both the first time period and a second time period to generate commands for presenting the video data. For example, the command selection process may consider a first time period of 10 seconds and a second time period of 5 seconds. In this example, if the generated command is to pan to a vocalist, the command implementation module will spend 5 seconds panning to the vocalist and then hold the position for an additional 5 seconds (for a total of 10 seconds between implementing commands) before implementing the next command.

In some embodiments, the first time period is determined by the tempo of the music. For example, if the performance is fast paced rock and roll, the first time period may be relatively short to allow for a quicker succession of editing instructions. In another example, if the performance is of a slow song, the first time period may be longer as the tempo is slower. In some embodiments, the first time period is determined is a factor the total length of time of the video data. In some embodiments, the first time period is a factor of the total length of time of the audio data. For example, if the audio data is one minute long, the first time period may be 2 seconds, but would not be 11 seconds.

In some embodiments, the editing instructions may include a point of focus. A point of focus may be an area within the frame of the video data that will inhabit the center of the frame upon a completed edit by the command implementation module 304. In some embodiments the point of focus is the center point of a region of interest. For example, for a rectangular region of interest, the point of focus may be the coordinates that correspond to the centroid of the rectangle. The centroid of the rectangle may be calculated by taking an average of the x-coordinates for each corner of the rectangle, and an average of the y-coordinates for each corner of the rectangle. In some embodiments, the point of focus is the pixel in a region of interest with the highest motion value according to a heatmap. For example, in a video feed of a person playing the guitar, the point of focus may be where the performer is strumming the guitar rather than the center point of the bounding box that contains the guitar.

In some embodiments the weighting system weighs spatial reference points and temporal reference points associated with a particular audio source more heavily. For example, the weighting system may place more weight on a reference point associated with vocals than a reference point associated with an instrumental or bodily percussion. In some embodiments, the weighting system for the plurality of spatial reference points and the plurality of temporal reference points may weigh the plurality of spatial and temporal reference points associated with a type of audio source so heavily, that those reference points will be the focus of the editing instructions when they appear within the video and audio profile. For example, the weighting system may place a weight on temporal reference points and spatial reference points associated with vocals that is heavier than any other weighting given by the weighting system, so that any time the reference points appear in the instructions, the editing commands will comprise instructions for cropping, scaling rotating, or panning in relation to the reference points associated with the vocals.

In some embodiments, the weighting system assigns a weighting to the temporal reference points and the spatial reference points based on a heatmap of the motion detected within the video profile. In some embodiments, the weighting system may assign a higher weight to the temporal reference points and spatial reference points associated with a peak motion based on the heatmap of motion detected within the video profile. For example, the heatmap may indicate that peak motion is on a drum set during a drum solo, and the weighting system may assign higher weight to the temporal reference points and spatial reference points associated with the drum solo. In some embodiments, the weighting system assigns a weighting to temporal reference points and spatial reference points based on the difference in value between motion identified at each reference point and an average motion value of the spatial reference point. For example, the weighting system may give greater weight to a vocalist than a drummer at a certain temporal reference point when the drummer has a higher motion value within the heatmap, because the difference between their current motion value on the heatmap and their average motion value on the heatmap is greater for the vocalist than the drummer. In some embodiments, average motion may refer to total measured motion divided by the total time of the performance. For example, if a performer had a total motion value of 60 over a period of 1 minute, their average motion would be 1, as they on average record one motion value a second.

In some embodiments, the commands may be generated using a machine learning model, where the machine learning model is configured to receive the video profile, audio profile, temporal reference points, and spatial reference points and generate video commands as outputs. In some embodiments the machine learning model is trained on pre-edited video data comprising a video profile, an audio profile, spatial reference points, temporal reference points, and the edits implemented within the video. For example, the machine learning model may be trained on pre-edited video data of recordings of concerts with the editing commands that were implemented throughout the edited video feed. The pre-edited video data may be video data edited by a person. In some embodiments, the machine learning model is also trained on a heatmap of motion of each region of interest within the video data.

At step 416, the director server 104 may send the video feed and the generated video commands to an end user device. In an alternative embodiment, the director server 104 may create an augmented video feed by performing the generated video commands 216 on the video, and at step 416 send the augmented video feed to an end user device 106.

At step 418, the end user device 106 may play the video feed and apply the commands to the video. The end user device may utilize a command implementation module 304 to receive the video 202 and the video commands 216 and apply the video commands to the video 202 to create an augmented video feed for display on the end user device. The augmented video feed may be created by performing video commands 216 on the video 202. In some embodiments, the end user device 106 may play an augmented video feed sent from the director server 106. As discussed above the end user device 106 may play the augmented video feed through the use of a video player 302 which may include but is not limited to hardware devices such as a CD player, or DVD player, or software such as QuickTime Player, Windows Media Player, or VLC media player. Prior to playing the videos on the end user device 106. In some embodiments, the command implementation module 304 may be toggled off. For example, the user may decide they prefer to watch the recording without any editing augmentations and select a setting on the video player or the command implementation module 304 to toggle off the editing commands. In some embodiments, the user may toggle off individual editing instructions. For example, the user may decide that they do not enjoy rotation of the video display and toggle that individual editing instruction off. In this example, if the command implementation module 304 receives a command for rotation, it will hold off on implementing the command, but if the command implementation module 304 receives a command for cropping, it will crop the video feed.

Figure 5B:
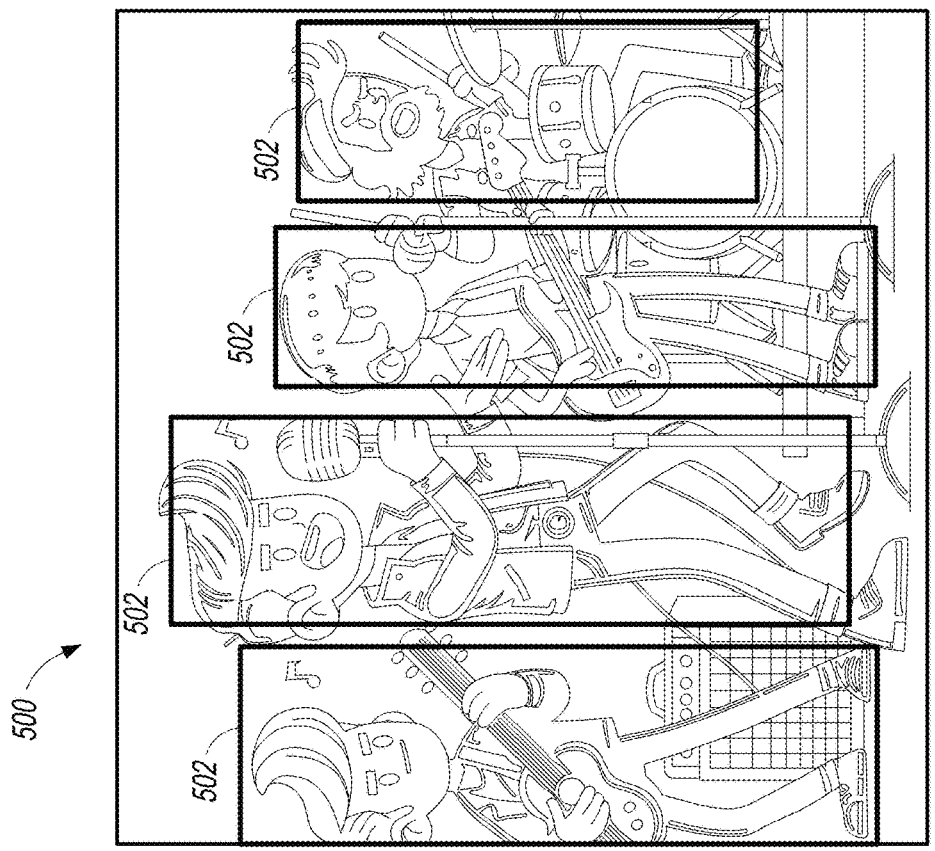
FIGS. 5A, 5B, and 5C are diagrams depicting how the system generates bounding boxes for different performers and objects within the video.
Figure 5A:
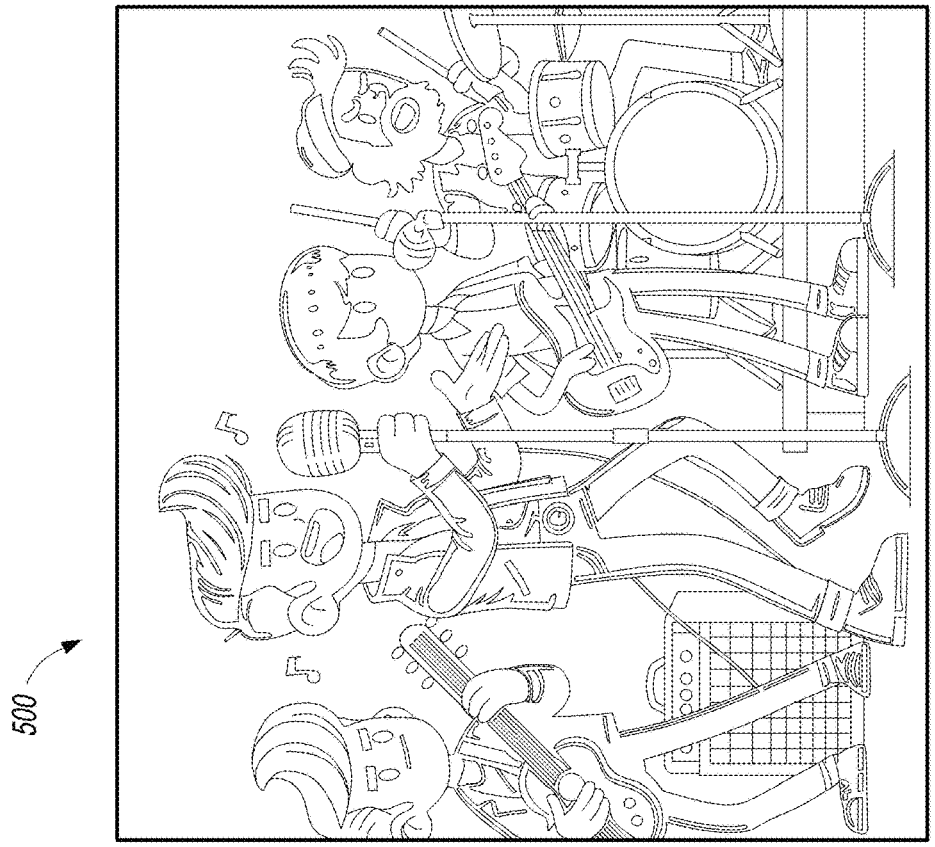
Figure 5C:
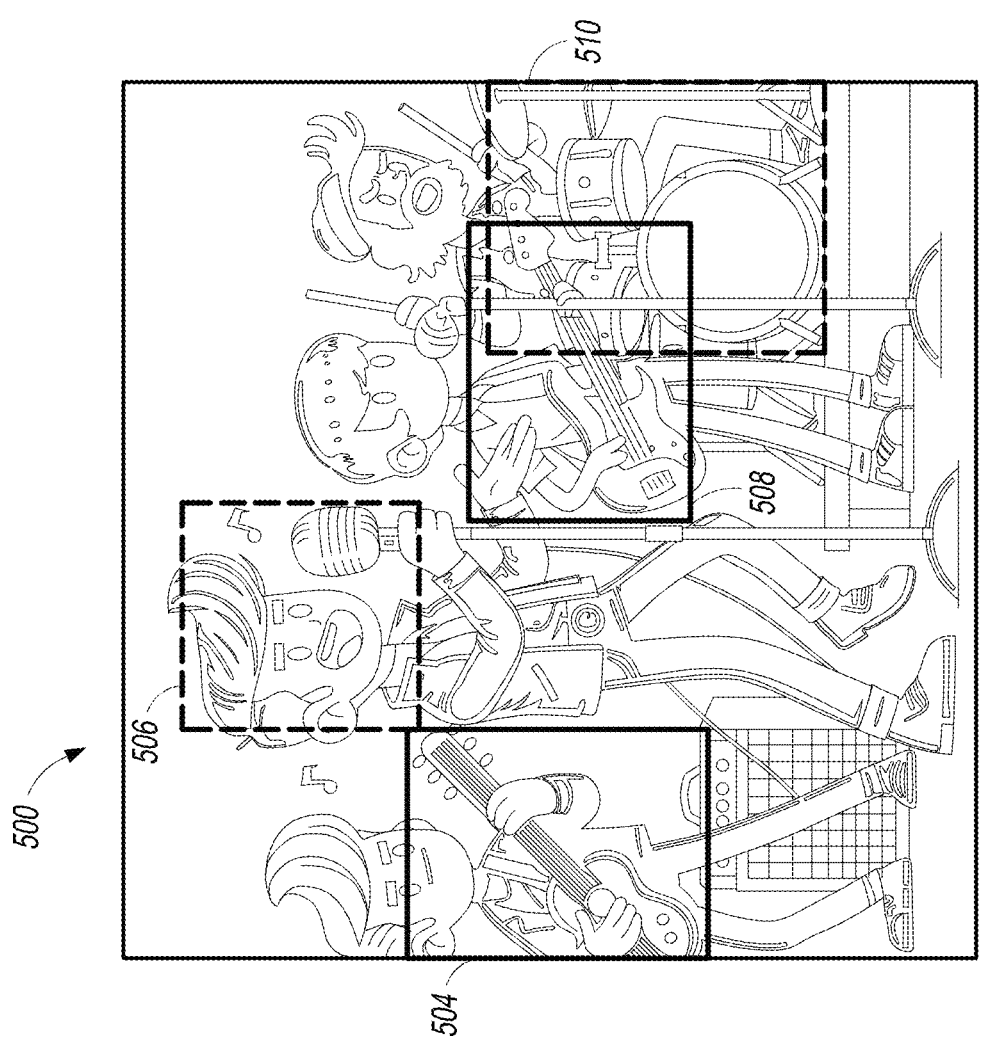

FIGS. 5A-5C are diagrams depicting how the system can use computer vision techniques to identify different people and objects of interest within the video 202. FIG. 5A depicts a video frame 500 of a video 202. FIG. 5B depicts the video frame 500 after having computer video techniques applied to identify areas of focus. The bounding boxes 502 each encapsulate a different region of interest identified using computer vision techniques. As shown in FIG. 5B there are four bounding boxes each encapsulating a unique performer. FIG. 5C depicts multiple bounding boxes of different sizes each capturing a region of interest other than a performer. Bounding box 504 captures a region of interest around a guitar on the left side of the frame. Bounding box 506 captures of region of interest including a vocalist's face. Bounding box 508 captures a region of interest that contains a second guitar on the right half of the frame. Finally bounding box 510 captures a region of interest containing a drum set. Although depicted separately, in some embodiments, bounding boxes as seen in FIG. 5B can be generated along side bounding boxes as depicted in FIG. 5C. For example, if the video 202 is of a band of four musicians, including one singer, two guitar players, and a drummer, the system may use computer vision techniques to draw eight bounding boxes. One bounding box for each performer as shown in FIG. 5B and one bounding box for each instrument or audio source as shown in FIG. 5C.

Figure 6B:
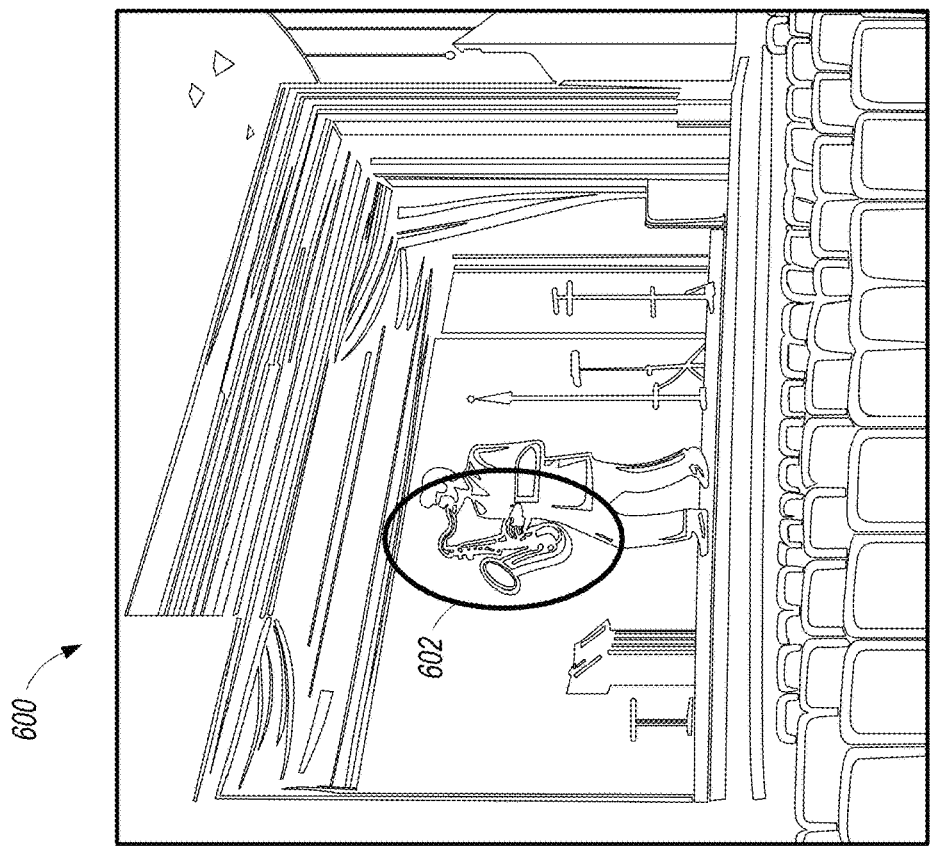
FIGS. 6A and 6B are diagrams depicting the generation of a temporal analysis of a video profile.
Figure 6A:
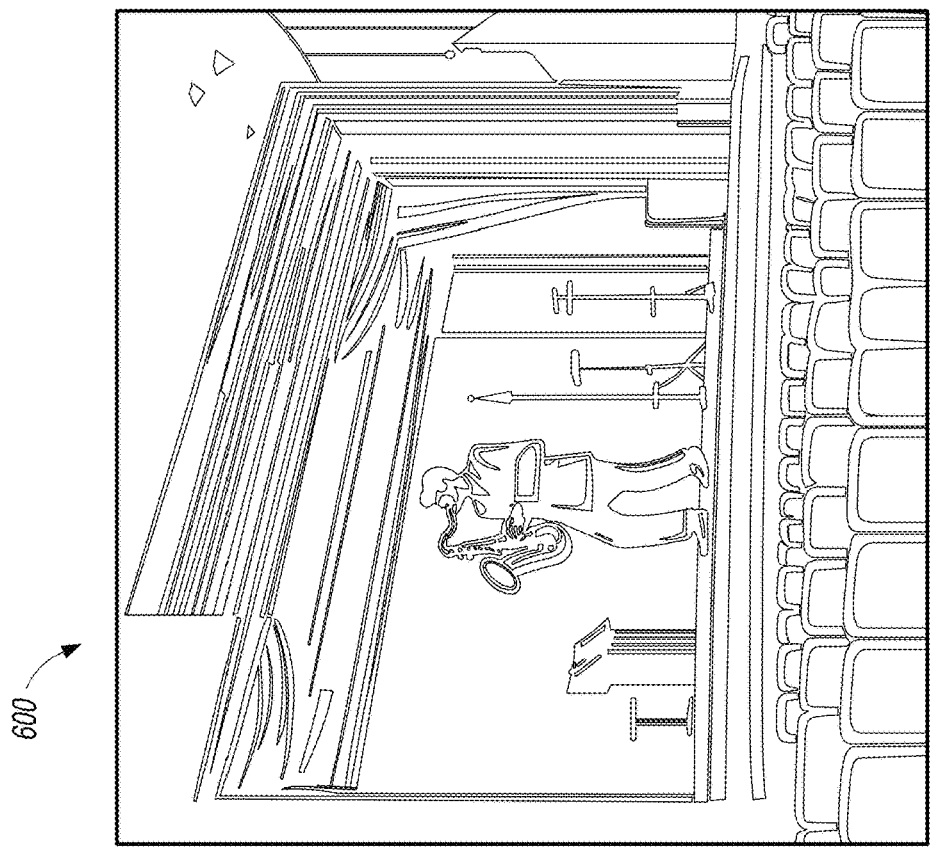

FIGS. 6A-B are diagrams depicting the generation of temporal analysis of a video profile. FIG. 6A depicts an illustration of a performer within the frame 600 of a video 202. FIG. 6B shows the frame 600 with a heatmap 602 overlayed on the performer to visualize the motion of the performer's hands relative to the motion detected in the remainder of the frame 600. As depicted in FIG. 6B the temporal analysis has determined the area of peak motion from the heatmap 602. That area corresponds to the musician's hands as they are playing the instrument.

Figure 7:
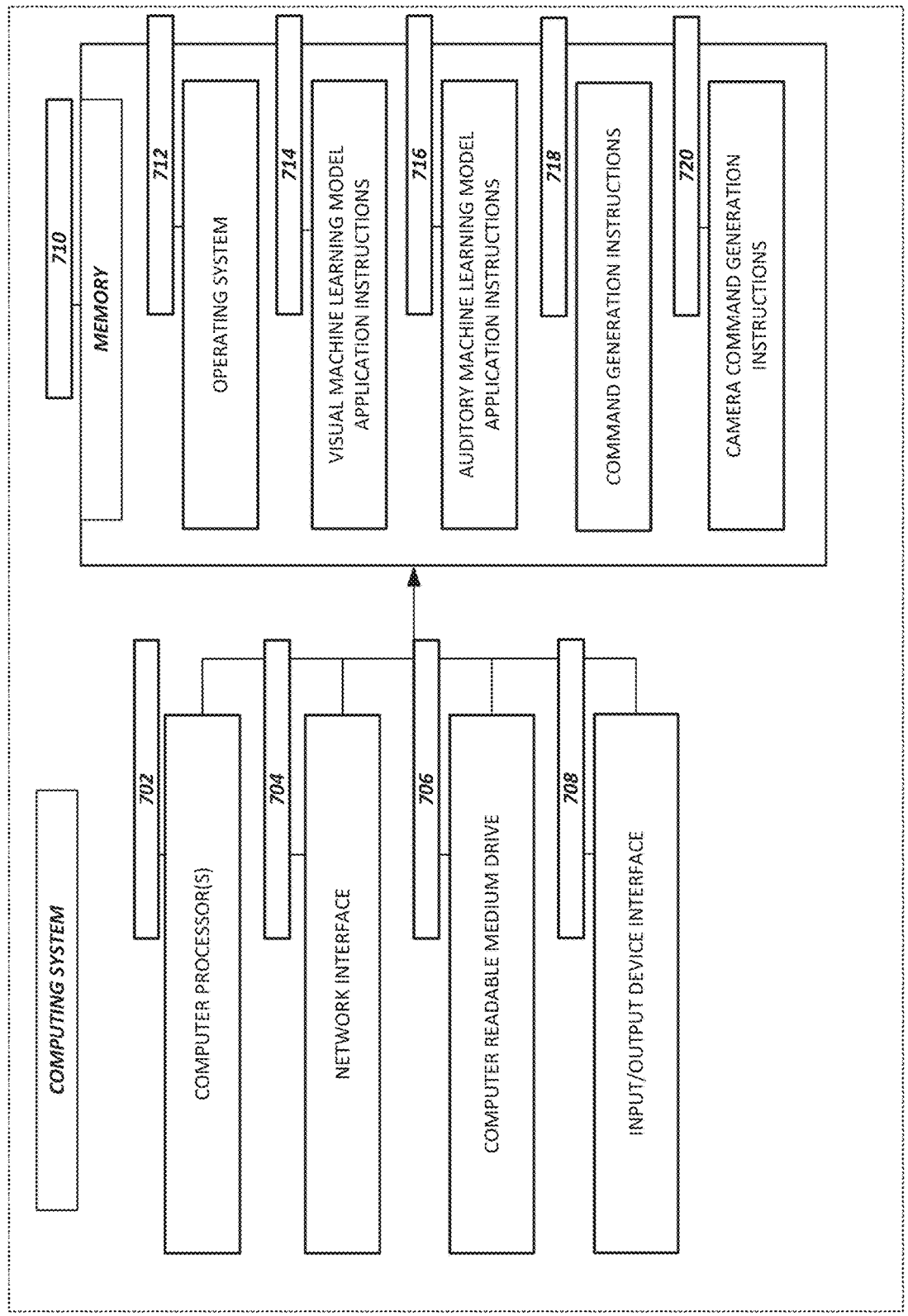
FIG. 7 is a diagram that illustrates the general architecture of the computing system implemented in FIG. 2.

FIG. 7 is a block diagram that illustrates the general architecture of the computing system implementing the director server 104.

The general architecture of the system depicted in FIG. 7 includes an arrangement of computer hardware and software that may be used to implement aspects of the present disclosure. The hardware may be implemented on physical electronic devices, as discussed in greater detail below. The system may include many more (or fewer) elements than those shown in FIG. 7. It is not necessary, however, that all of these generally conventional elements be shown in order to provide an enabling disclosure. Additionally, the general architecture illustrated in FIG. 7 may be used to implement one or more of the other components illustrated in FIG. 1. As illustrated, the system includes computer processors 702, a network interface 704, a computer readable medium drive 706, and an input/output device interface 708, all which may communicate with one another by way of a communication bus.

The network interface 704 may provide connectivity to one or more computing systems. The computer processors 702 may thus receive information and instructions from other computing systems or services via the network 108. The computer processors 702 may also communicate to and from memory 710 and further provide output information for an optional display (not shown) via the input/output device interface 708.

The memory 710 may contain computer program instructions (grouped as units in some embodiments) that the computer processors 702 execute in order to implement one or more aspects of the present disclosure along with data used to facilitate or support such execution. Program instructions may be sequences of binary or symbolic codes that a CPU or GPU interprets and executes. Program instructions may be executed in a cycle known as fetch-execute cycle where the CPU fetches an instruction from memory, decodes it, and then executes it. While shown in FIG. 7 as a single set of memory 710, memory 710 may in practice be divided into tiers, such as primary memory and secondary memory, which tiers may include (but are not limited to) random access memory (RAM), 3D XPOINT memory, flash memory, magnetic storage and the like. For example, primary memory may be assumed for the purposes of description to represent a main working memory of the system, with a higher speed but lower total capacity than a secondary memory, tertiary memory, etc.

The memory 710 may store an operating system 712, visual machine learning model application instructions 714, auditory machine learning model application instructions, command generation instructions 718, and camera command generation instructions 720.

The operating system 712, may represent code to facilitate a computer's basic functions such as scheduling tasks, executing applications, and controlling peripherals.

The visual machine learning model application instructions 714 may represent code executable to intermediate between a video feed 402 and a visual machine learning model 204. The auditory machine learning model application instructions 716 may represent code executable to intermediate between a video feed 402 and the auditory machine learning model 208. The command generation instructions 718 may represent code to facilitate generation of commands to implement on a video 202 based on the analysis from the visual machine learning model 204 and the auditory machine learning model 208. The camera command generation instructions 720 may represent code executable to generate commands for camera manipulation.

The system of FIG. 7 is one illustrative configuration of such a device, of which others are possible. For example, while shown as a single device, a system may in some embodiments be implemented as one or more virtual devices executing on a physical computing device. While described in FIG. 7A system for generating commands to transform a video 202, similar components may be utilized in some embodiments to implement other devices shown in the video command generation system in FIG. 7.

Figure 8:
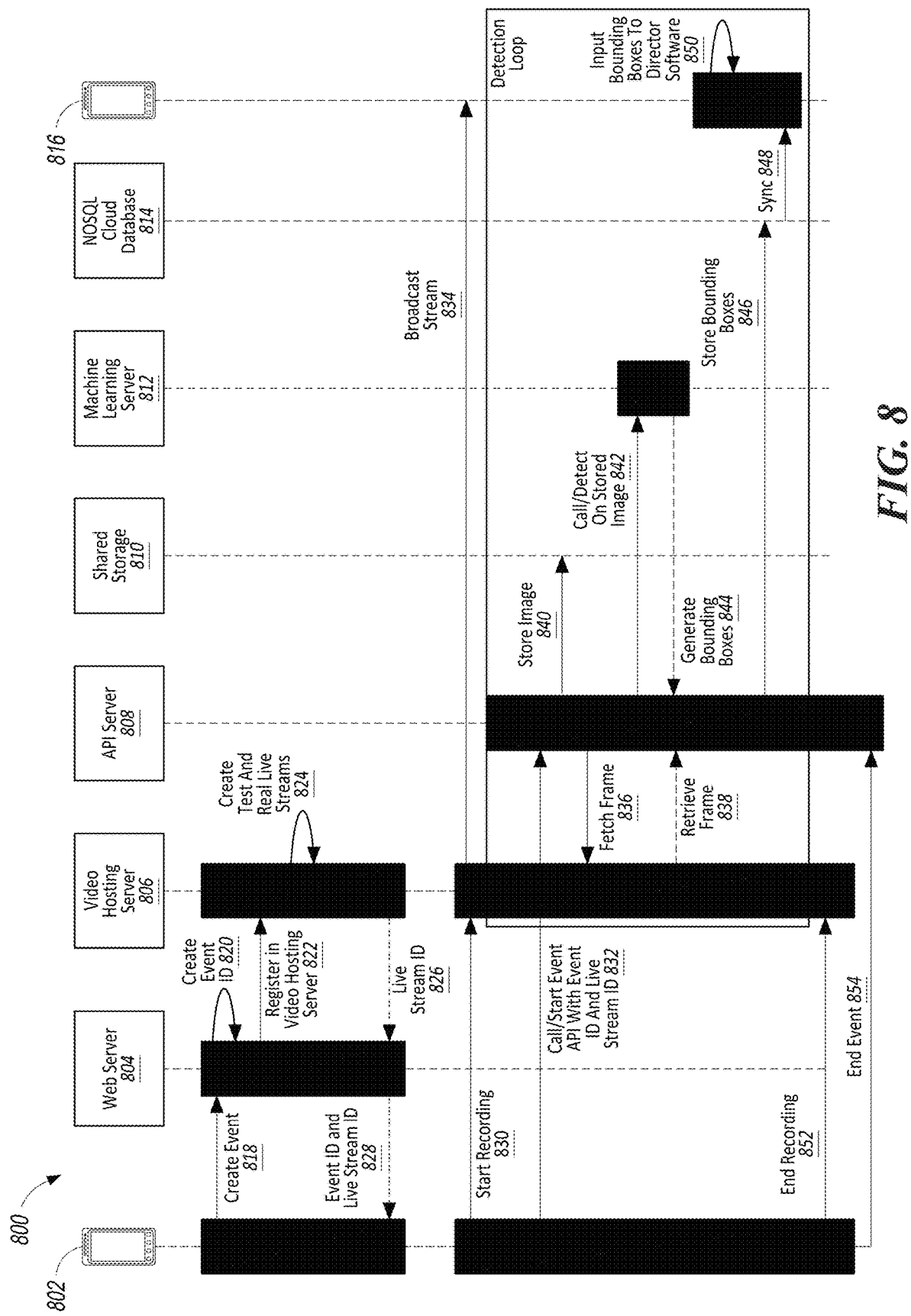
FIG. 8 is a diagram depicting an example routine for obtaining and processing a video captured by a smartphone and presenting it to a user device.

FIG. 8 is an example routine 800 for capturing, processing, and presenting a video feed to a user device. The routine 800 describes different sections of one embodiment of the present invention. The routine 800 describes different elements of the invention comprising a camera application, machine learning models for detecting and labeling the target sections of an image, a director software application for determining the target sections to be viewed at each instant in time, both running on a server, and client software running on a user's computing device receiving instructions from the director application and displaying the target image to the user. In some embodiments, the entire frame recorded by a camera are scanned by machine learning models to detect objects including but not limited to a human face or body, hands, musical instruments, microphones, and lips. In some embodiments, the machine learning models implemented may be further configured to determine if a target subject is moving more than a threshold amount in horizontal or vertical directions, including but not limited to movements in either or both directions at the same time. In some embodiments, as the target moves, the director application may suggest a new target section, where the new target section captures the target subject within the center of the frame. In some embodiments, this shift may cause a perception of a pan in the x-y plane. In some embodiments, the machine learning models may also detect if there is more than one performer within the scene and the routine may perform similar processing on each performer, their instrument, hands, face, upper body, and lower body.

A device 802 creates an event for the performance to be recorded and shares that event with a web server 804 at 818. In some embodiments, the device 802 may use a camera application to create an event for the performance to be recorded. For example, the device 802 may use an application that enables a user to input a title and additional information into user fillable fields. The web server 804 creates an event ID at 820 and registers the event ID on a video hosting server 806 at 822. In some embodiments the web server 804 may host an online streaming service. For example, the web server 804 may be a server located within a networked computing environment that is remote from the device 802. The web server 804 may register the event ID with a video hosting server 806. In some embodiments, the video hosting and streaming server may be a Mux video server. The video hosting server 806 creates test and real live steams at 824. For example, the video hosting and streaming server 806 can enable a user to create a test stream prior to using the video hosting server 806 for the live stream. The video hosting server 806 sends the live stream ID back to the web server 804 at 826. The web server 804 then relays the event ID and livestream ID to the device 802 at 828.

The device 802 begins recording a performance and shares the recording with the video hosting server 806 at 830. In some embodiments, the smartphone shares the video recording with a Mux video server. The device 802 then makes a call to an API server 808 to start the event with the event ID generated by the web server 804 at 832. The API server 808 broadcasts the stream to the user device 816 at 834.

The API server 808 calls on the video hosting server 806 for a video frame from the recording at 836, and the video hosting server 806 returns a video frame to the API server 808 at 838. The API server 808 then stores the image on a shared storage 810. The API server 808 then interacts with an ML server 812 hosting a machine learning model, by calling detect objects 842 within the image stored at 840. In some embodiments the machine learning model scans the entire frame of the image stored at 840. In some embodiments, the machine learning model only scans a portion of the frame of the image stored at 840. The ML server 812 generates a bounding box for each object detected in the image stored at 840 and sends the bounding box data to the API server 808 at 844. In some embodiments, the machine learning model scans the frame of the image to detect objects including but not limited to a human face, body, hands, musical instruments, microphones, and lips. In some embodiments, the machine learning model may detect if there is more than one performer or object within the frame. For example, during a recording of a performance of a vocalist and guitarist, the ML server 812 may generate a bounding box around the vocalist's face, the vocalist's upper body, the guitarist's guitar, and the guitarist's upper body. In some embodiments, the machine learning model may be further configured to determine if a target subject is moving more than a threshold amount in a horizontal or vertical direction. For example, the machine learning model may track an identified object through successive frames to determine a motion value associated with the object, and compare that motion value to a threshold value. The API server 808 stores the bounding boxes in a NOSQL cloud database 814 at 846. In some embodiments, a NOSQL cloud database may be a Firebase database, a MongoDB database, and an Amazon Dynamo database.

The NOSQL cloud database 814 syncs the bounding box data to the user device 816 at 848. For example, if the bounding box data has changed throughout the recording of the performance, the NOSQL cloud database 814 will be updated with the new information and the user device 816 will retrieve the updated bounding box data from the NOSQL cloud database 814

A director software on the user device 816 receives the synced bounding box data from the user device 816 and uses it as inputs to determine director edits. The director software returns the director edits to be implemented on the broadcast stream 834 to the user device 816 at 850. In some embodiments, the director software may suggest a new target section as a target subject moves throughout the performance in order to keep the target subject in the center of the frame. For example, the director software may continue to suggest a new target section further to the left of the previous target section as the target subject moves to the left. In some embodiments, this shift may cause a perception of a pan in the x-y plane.

At 852 the device 802 may send a signal to the video hosting and streaming server 806 to end the recording. At 854 the device 802 may send a signal to the API server 808 to end the event. Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

Unless otherwise explicitly stated, articles such as "a" or "an" should generally be interpreted to include one or more described items throughout this application. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. Unless otherwise explicitly stated, the terms "set" and "collection" should generally be interpreted to include one or more described items throughout this application. Accordingly, phrases such as "a set of devices configured to" or "a collection of devices configured to" are intended to include one or more recited devices. Such one or more recited devices can also be collectively configured to carry out the stated recitations. For example, "a set of servers configured to carry out recitations A, B and C" can include a first server configured to carry out recitation A working in conjunction with a second server configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A computer-implemented method for generating a structured content container comprising instructions for programmatically controlling a display of video data, the computer-implemented method comprising, by one or more electronic processors executing program instructions:

generating a video profile of a live performance by:
receiving a video recording of the live performance, the video recording captured using one or more video recording devices positioned to record performers, instruments, stage areas, and/or audience reactions;
extracting video data from the video recording, wherein the video data comprises image sequences depicting movements, gestures, facial expressions, positions, and interactions of the performers and/or instruments;
applying computer vision techniques to identify and track individual performers and instruments within the video data; and
generating and storing the video profile, the video profile comprising a plurality of spatial reference points associated with the identified performers or instruments;

generating a video temporal analysis of the live performance by:
classifying within the video profile at least one of the movements, gestures, facial expressions, positions, or interactions of the performers and/or instruments using a first machine learning model trained on annotated video data representing various performance scenarios;
determining a visual context of the live performance at specific intervals based on the classified movements, gestures, facial expressions, positions, and/or interactions; and
generating the temporal analysis of the live performance by identifying intervals of peak motion associated with each of the identified performers and instruments;

generating an audio profile of the live performance by:
receiving an audio recording of the live performance, the audio recording captured using one or more audio recording devices positioned to record performers, instruments, stage areas, and/or audience reactions;
extracting audio data from the audio recording, wherein the audio recording comprises a recording of at least one of vocals, instrumentals, or bodily percussions;
applying audio recognition techniques on the audio data to identify and track an individual performer or instrument within the audio data; and
generating and storing the audio profile, the audio profile comprising a plurality of temporal reference points associated with the identified individual performers or instruments;

generating an audio temporal analysis of the live performance by:
classifying within the audio profile the at least one of the vocals, instrumentals, or bodily percussions using a second machine learning model trained on annotated audio data representing various performance scenarios;
determining an auditory context of the live performance at specific intervals based on the classified vocals, instrumentals, or bodily percussions; and
generating the audio temporal analysis of the live performance by identifying intervals of activity associated with each of the identified individual performers or instruments;

generating commands for presenting the video data given editing instructions comprising: cropping, scaling, rotating, or panning in relation to the plurality of spatial reference points and the plurality of temporal reference points using a command selection process comprising:
determining from the audio profile a first time index associated with a vocalization;
identifying within the video profile, a first performer associated with the vocalization;
determining from the audio profile a second time index associated with an instrumental performance without vocalization; and
identifying within the video profile a second performer associated with the instrumental performance, wherein the second performer is identified by an instrumental performer identification process comprising:

determining that the identified instrument is associated with the second performer and that the identified instrument is not unique within the video profile; and in response to determining that the identified instrument is not unique within the video profile, identifying the second performer based on an interval of peak motion from the video temporal analysis associated with the second time index;

wherein the commands control the display of the video data by applying at least one of the editing instructions to the first performer at the first time index and by applying at least one of the editing instructions to the second performer at the second time index; and generating the structured content container, the structured content container comprising the commands, the video data, and the audio data; and transmitting the structured content container.

2. The computer-implemented method of claim 1 wherein generating the video temporal analysis comprises generating a heatmap based on motion within the video profile.

3. The computer-implemented method of claim 2 wherein, the heatmap is generated based at least in part on changes in pixels associated with spatial reference points.

4. The computer-implemented method of claim 1 wherein generating commands for presenting the video data comprises:

applying a pre-determined command format, wherein the pre-determined command format includes a command selection process that considers parameters comprising:

the audio profile, a first time index associated with a vocalization, a heatmap of motion of each performer and instrument of the video profile, and a timer, wherein the pre-determined command format includes editing instructions comprising:

cropping, scaling, rotating, or panning in relation to the plurality of spatial reference points and the plurality of temporal reference points based on a weighting system for the plurality of spatial reference points and the plurality of temporal reference points, and a time period, wherein the time period defines a length of time between execution of each pre-determined command.

5. The computer-implemented method of claim 4 wherein the weighting system comprises assigning a first weighting to vocals then a second weighting assigned to instrumentals and bodily percussions, where the first weighting is higher than the second weighting.

6. The computer-implemented method of claim 4 wherein the weighting system assigns a weighting based at least in part on the heatmap of motion of each of the identified performers and identified instruments.

7. The computer-implemented method of claim 4 wherein the weighting system is based at least in part on a difference in value between a motion of each identified instrument or performer at a first time index, and an average motion of each identified instrument or identified performer.

8. The computer-implemented method of claim 5 wherein commands are generated for every time index of the video profile and audio profile that correspond to a multiple of the time period.

9. The method of claim 4 wherein the time period based at least in part on a tempo of the audio profile.

10. The computer-implemented method of claim 1 wherein the identified vocals or instruments in the audio profile can be associated with the identified performers or instruments in the video profile by matching the identified vocal or instrumental to a corresponding identified instrument or performer when the identified vocal or instrumental is unique within the video profile.

11. The computer-implemented method of claim 1 wherein the commands are executed concurrently with a live performance.

12. The computer-implemented method of claim 1, wherein identifying performers comprises determining one or more portions of the video data corresponding to a body, an upper body, and/or a mouth of one or more performers.

13. The computer-implemented method of claim 1, wherein identifying instruments comprises determining one or more portions of the one or more instruments.

14. The computer-implemented method of claim 1, wherein generating a video command comprises providing a third machine learning model the spatial reference points, the temporal reference points and the audio profile, wherein the third machine learning model is configured to receive the spatial reference points, the temporal reference points and the audio profile as inputs and generate video commands as outputs.

15. The computer-implemented method of claim 14, wherein the third machine learning model is trained on pre-edited video data of a performance alongside a video profile, an audio profile, and heatmap of motion of each performer and instrument of the video profile.

16. A computer-implemented method for generating a structured content container comprising instructions for programmatically controlling a display of video data, the computer-implemented method comprising, by one or more electronic processors executing program instructions:

generating a video profile of a live performance by:

receiving a video recording of the live performance, the video recording captured using one or more video recording devices positioned to record performers, instruments, stage areas, and/or audience reactions;

extracting video data from the video recording, wherein the video data comprises image sequences depicting movements, gestures, facial expressions, positions, and interactions of the performers and/or instruments;

applying computer vision techniques to identify and track individual performers and instruments within the video data; and generating and storing the video profile, the video profile comprising a plurality of spatial reference points associated with the identified performers or instruments;

generating a video temporal analysis of the live performance by:

classifying within the video profile at least one of the movements, gestures, facial expressions, positions, or interactions of the performers and/or instruments using a first machine learning model trained on annotated video data representing various performance scenarios;

determining a visual context of the live performance at specific intervals based on the classified movements, gestures, facial expressions, positions, and/or interactions; and generating the temporal analysis of the live performance by identifying intervals of peak motion associated with each of the identified performers and instruments;

generating an audio profile of the live performance by:

evaluating the video temporal analysis and the identified performers and instruments to generate temporal reference points associated with the identified individual performers or instruments, and periods of motion associated with the identified individual performers or instruments within the video temporal analysis; and generating the audio temporal analysis of the live performance by identifying intervals of activity associated with each of the identified individual performers or instruments;

generating commands for presenting the video data given editing instructions comprising: cropping, scaling, rotating, or panning in relation to the plurality of spatial reference points and the plurality of temporal reference points using a command selection process comprising:

determining from the audio profile a first time index associated with vocalization;

identifying within the video profile, a first performer associated with the vocalization;

determining from the audio profile a second time index associated with an instrumental performance without vocalization; and identifying within the video profile a second performer associated with the instrumental performance, wherein the second performer is identified by an instrumental performer identification process comprising:

determining that the identified instrument is associated with the second performer and that the identified instrument is not unique within the video profile; and in response to determining that the identified instrument is not unique within the video profile, identifying the second performer based on an interval of peak motion from the video temporal analysis associated with the second time index;

wherein the commands control the display of the video data by applying at least one of the editing instructions to the first performer at the first time index and by applying at least one of the editing instructions to the second performer at the second time index; and generating the structured content container, the structured content container comprising the commands, the video data, and the audio data; and transmitting the structured content container.

17. The computer-implemented method of claim 16, wherein an augmented video feed is created by performing the video commands on the video data, and the augmented video feed is displayed on a user device.

18. The computer-implemented method of claim 17, wherein the user device is a smartphone or personal computer.

19. The computer-implemented method of claim 18, wherein application of editing instructions to the video can be toggled on and off.

20. The computer-implemented method of claim 19, wherein the application of individual editing instructions can be toggled on and off.

* * * * *